United States Patent
Kato et al.

[11] Patent Number: 5,997,991
[45] Date of Patent: Dec. 7, 1999

[54] DEODORIZING MATERIAL

[75] Inventors: Taro Kato; Shinji Arai, both of Iwate, Japan

[73] Assignee: Kitakamiseishi Kabushiki Kaisha, Japan

[21] Appl. No.: 08/916,288

[22] Filed: Aug. 22, 1997

[30] Foreign Application Priority Data

May 12, 1997 [JP] Japan ................................. 9-135731

[51] Int. Cl.⁶ .............................. B32B 3/28; B01D 24/00
[52] U.S. Cl. ...................... 428/182; 428/34.2; 428/172; 428/179; 424/76.1; 424/647; 424/709; 55/520; 55/521; 55/524
[58] Field of Search ................................. 428/182, 34.2, 428/172, 137, 131, 188, 179, 537.5; 55/521, 520, 524; 424/76.1, 76.9, 647, 648, 709; 156/205; 106/123.11; 162/109, 118, 119, 164.5; 210/601, 667, 758

[56] References Cited

U.S. PATENT DOCUMENTS

| 3,800,515 | 4/1974 | Asker et al. | 55/163 |
| 5,082,528 | 1/1992 | Hartman | 162/175 |
| 5,110,414 | 5/1992 | Forss et al. | 162/163 |

Primary Examiner—Donald Loney
Attorney, Agent, or Firm—Rogers & Killeen

[57] ABSTRACT

The present invention proposes light-weight and easy-to-handled deodorizing material that has a large contact area with bad smell-causing gas as well as better deodorizing performance and also that enjoys a smooth circulation of that gas with a lower permeation resistance. A single-faced corrugated fiberboard made of a cellulose-based substance is allowed to contain ferrous sulfate, which is subsequently oxidized into basic ferric sulfate.

8 Claims, 2 Drawing Sheets

DEODORIZING MATERIAL

BACKGROUND OF THE INVENTION

1. Field of the Invention

The present invention relates to the deodorizing material that can eliminate the bad smell given off by the wastes from animals and human beings as well as the bad smelling components existing in the rooms, refrigerators, garbage cans, or other environments.

2. Description of the Related Art

Various kinds of deodorizing material have been proposed and put to practical application. Most of them, however, cannot eliminate the smell from the wastes of human beings or animals, having rather modest effects.

To guard against this, one of the inventors of the present invention has earlier worked out deodorizing material to eliminate the smell from the wastes of human beings or animals, wherein the cellulose-based substance or its formation member contains ferrous sulfate which is subsequently oxidized into basic ferric sulfate, and has already obtained the patent right (laid-open patent publication 1642383).

This deodorizing material combines cellulose and basic ferric sulfate, coming in sheet, paper, lump, cotton, cloth, and clothing in geometry. The lump-shaped material in particular has extremely large deodorizing effects in elimination of the bad smell from the toilets or the cars carrying human wastes.

Thus, the above-mentioned deodorizing method is generally combined with an air blower to send exhaust gas upward through a barrel charged with the above-mentioned lump-shaped deodorizing material so that the gas may come in contact with that material, thereby eliminating the bad smell. This method, however, has rather poor permeability and suffers from rather a high permeation resistance while deodorizing, requiring an increased capacity of an air blower, which in turn brings about an undesirable environment problem of the resultant rotation noise.

Originally, the deodorizing material has its effects only when it comes in contact with smell causing gas, so that such method as mentioned above has a large permeation resistance and therefore produces large noise, being not so light enough in weight although it is light as compared to the conventional material.

SUMMARY OF THE INVENTION

In order to solve the problems of the above-mentioned conventional prior art, the present invention proposes such light-weighted easy-to-use deodorizing material that has a large contact area with smell-causing gas as well as better deodorizing performance and also smooth circulation of that gas.

To this end, the deodorizing material according to the present invention comprises a single-faced corrugated fiberboards made of a cellulose-based substance that contains in it ferrous sulfate which is subsequently oxidized into basic ferric sulfate.

That is, deodorizing material according to the present invention can be obtained by dipping a single-faced corrugated fiberboard made of a cellulose-based substance into a solution of ferrous sulfate, and then mostly dehydrating it with a dehydrator etc. to oxidize this ferrous sulfate into basic ferric sulfate. Thus-obtained deodorizing material, once it comes in contact with smell-causing gas, will eliminate it rapidly.

With this, the above-mentioned deodorizing mechanism is assumed to have a catalytic action in such a way that the tri-valent iron ions of basic ferric sulfate undergo coordinate bond with the hydroxyl groups of cellulose, thus promoting a reaction of smelling components with oxygen in the air. Specifically therefore, if the smell-causing gas comes from wastes of human beings or animals, hydrogen sulfide and ammonia, which are smell-causing components, are changed into a pair of water and sulfur and another of nitrite ions and water respectively.

Also, by cutting the above-mentioned single-faced corrugated fiberboard to an appropriate size of rectangles and forming them into a laminated rectangle-shaped member and allowing it to contain ferrous sulfate and then oxidizing it into basic ferric sulfate, it is possible to obtain deodorizing material having such a porous rectangular shape that has many longitudinal mountain-shaped through pores. Thus obtained deodorizing material can be put in a container directly or properly permeably and placed in refrigerators, garbage cans, boot cupboards etc., to eliminate the bad smell coming from them. Also, the above-mentioned single-faced corrugated fiberboard may be cut to a square shape and formed in such a way that the pores would be oriented in mutually opposite directions.

Also, by rolling the above-mentioned single-faced corrugated fiberboard into a cylinder, ellipsoid, rectangular barrel, or other barrel shaped member and, in much the same way as mentioned above, allowing the member to contain ferrous sulfate and then oxidizing it into basic ferric sulfate, it is possible to obtain deodorizing material with a through-type porous cylindrical shape that has many longitudinal mountain-shaped through pores. Thus obtained deodorizing material will enjoy a larger area in contact with bad smell with a lesser permeation resistance, so that it can be combined with an air blower and placed on the intake or exhaust side of the deodorizing unit to send out the smell through the many pores so that it may come in contact with the walls of the pores so as to be rapidly deodorized. This mechanism, moreover, has a better permeability because of those pores as well as better exhaust performance, resulting in reduced noise.

Although the above-mentioned embodiment was described with respect to the case where a single-faced corrugated fiberboard is used as the cellulose-based substance, the shape of the respective pores of deodorizing material employed in the through-type porous rectangle or the through-type porous barrel is not limited to the above-mentioned mountain type but can be a triangle, quadrangle, hexagon (honeycomb), or other polygon or a circle or ellipsoid.

DESCRIPTION OF THE PREFERRED EMBODIMENTS

Figure 1:
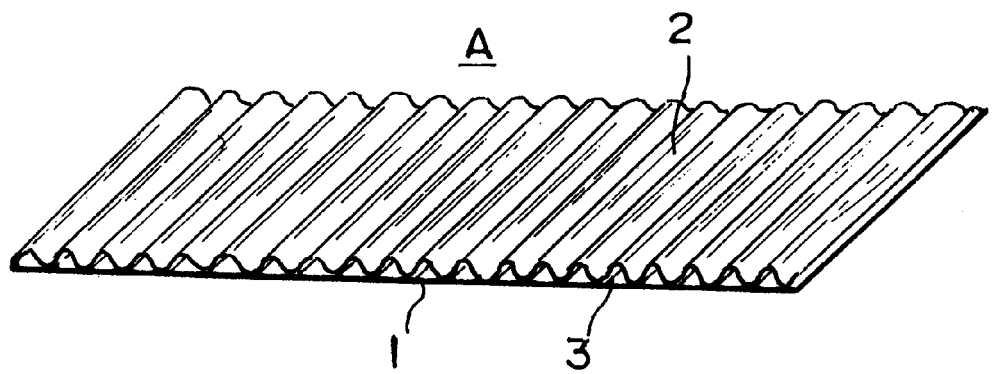
FIG. 1 is a perspective view of exemplified deodorizing material according to the present invention formed into a single-faced corrugated fiberboard.
Figure 2:
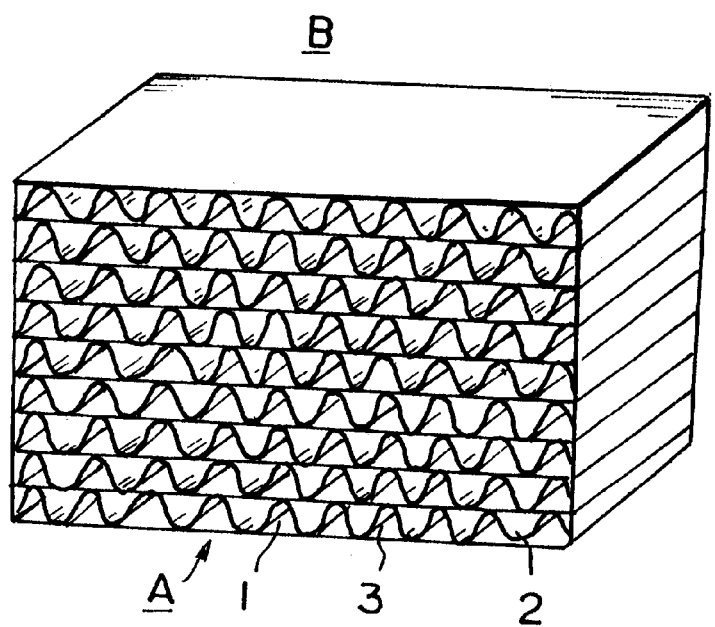
FIG. 2 is a perspective view of deodorizing material according to the present invention obtained by cutting the single-faced corrugated fiberboard shown in FIG. 1 to an appropriate size and laminating them into a rectangular shape.
Figure 3:
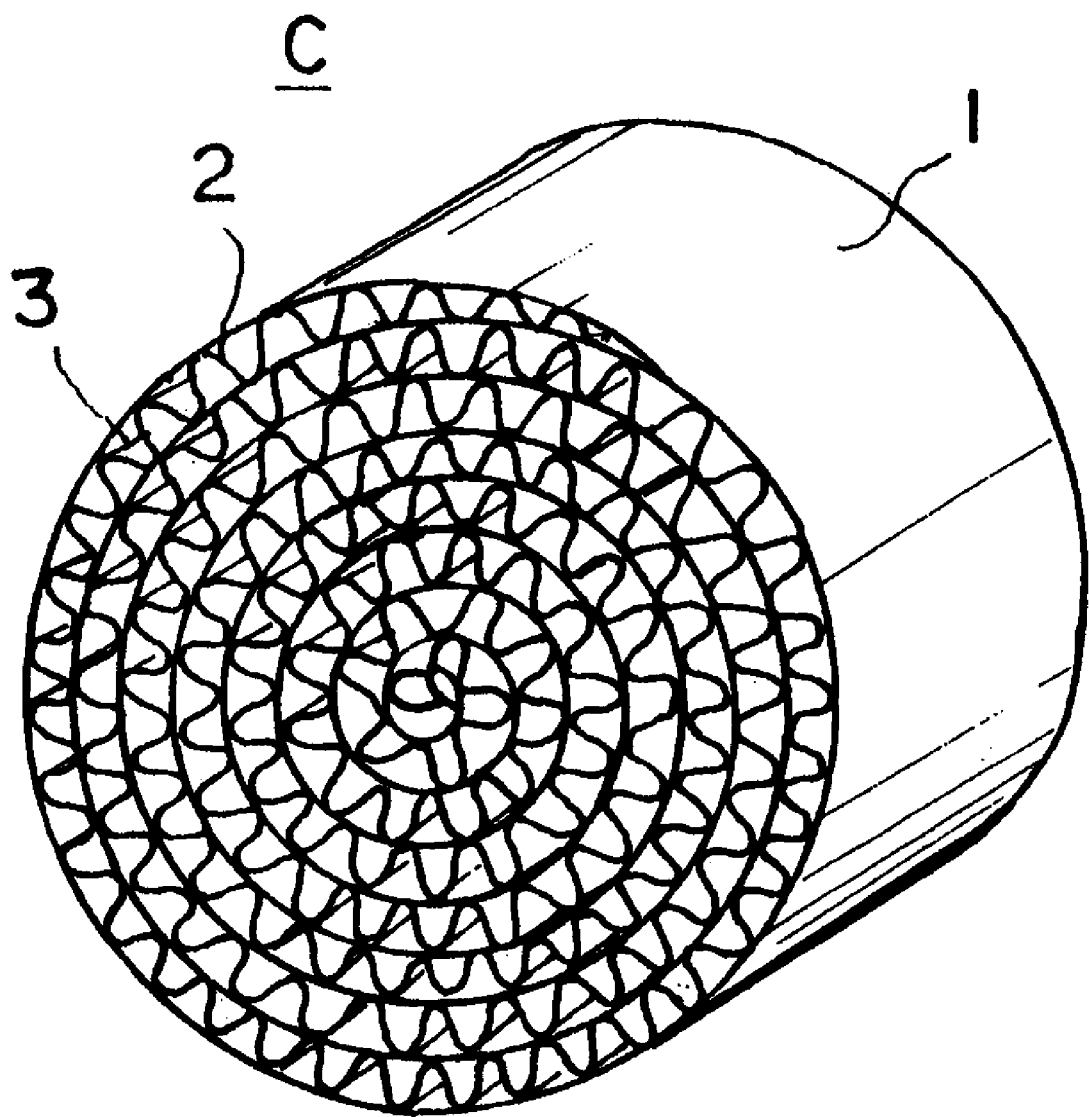
FIG. 3 is a perspective view of deodorizing material according to the present invention obtained by rolling the single-faced corrugated fiberboard shown in FIG. 1 into a cylindrical shape.

An embodiment of the present invention will hereinafter be described with reference to the drawing. FIG. 1 is a perspective view of an example of deodorizing material according to the present invention formed into a single-faced corrugated fiberboard; FIG. 2 is a perspective view of deodorizing material according to the present invention that a single-faced corrugated fiberboard shown in FIG. 1 is cut to an appropriate size and laminated and formed into a rectangle; and FIG. 3 is a perspective view of deodorizing material according to the present invention that a single-faced corrugated fiberboard shown in FIG. 1 is rolled and formed into a cylinder.

Preparation of Ferrous Sulfate Solution

As much as 225-kilogram of ferrous sulfate, FeSO4.7H2O is diluted with water into a total volume of 1000 liters of ferrous sulfate solution.

In FIG. 1, numeral 1 represents a flat base fiberboard made of a cellulose-based substance, paper, and numeral 2 represents a corrugated fiberboard similarly made of paper, which is bonded onto the base fiberboard 1 to form a single-faced corrugated fiberboard which comprises a number of parallel through-type mountain-shaped pores 3. This single-faced corrugated fiberboard is dipped into the above-mentioned ferrous sulfate solution, which is then dehydrated by 50%, i.e. the same mass as that fiberboard, with a centrifugal dehydrator. Next, it is heated and dried until it has a 10% water content, to obtain single-faced corrugated fiberboard-type deodorizing material A. This deodorizing material A, having a large surface area, may be arranged in a refrigerator, garbage can, or boot cupboard with the base fiberboard bonded onto its inner wall so that the air circulating through any of them comes in contact with the surfaces of the corrugated fiberboard 2 and the inner walls of through pores 3, thus eliminating the bad smell contained in that air.

FIG. 2 shows rectangle-shaped deodorizing material B wherein the single-faced corrugated fiberboard-type deodorizing material A shown in FIG. 1 is cut to an appropriate size and laminated as many as appropriate and fixed. This deodorizing material B may be arranged as it is in a container with a proper permeability and arranged in a refrigerator, garbage can, or boot cupboard, to eliminate, in much the same way as mentioned above, the bad smell in the air circulating through any of them.

Also, this deodorizing material B is not limited to any particular wind direction and has a lesser permeation resistance, so that when combined with an air blower it can be used in any posture, i.e. irrespective of whether it is placed vertically, horizontally, or obliquely. Moreover, it does not require an exclusive-use air blower and so can be attached at the intake or outlet of an air conditioner of houses or cars or at the front face of a fan, thus enabling elimination of the bad smell of the indoor air.

Also, the above-mentioned deodorizing material B can be made in such a way that a single-faced corrugated fiberboard consisting of the base fiberboard 1 and the corrugated fiberboard 2 is cut to an appropriate size and laminated as many as appropriate and fixed into a rectangle, which is then dipped into the above-mentioned ferrous sulfate solution and properly dehydrated with a centrifugal dehydrator etc. and then heated and dried down to a 10% water content.

Not being limited to the above-mentioned deodorizing material B wherein all of its through pores 3 are oriented in the same direction, the present invention enables orienting those through pores 3 in mutually different directions before the deodorizing material A or the single-faced corrugated fiberboard is laminated and fixed. In this case, the permeation becomes multi-directional, improving the deodorizing effects within a refrigerator, garbage can, and boot cupboard.

FIG. 3 shows the single-faced corrugated fiberboard-type deodorizing material A shown in FIG. 1 being rolled into an fixed cylinder shape of deodorizing material C. This deodorizing material C may be arranged on the intake or exhaust side of an air blower in such a way as to fit its geometry, so that the air passing through that side and therefore a number of through pores 3 as well will come in contact with their walls, thus eliminating its bad smell in a smooth permeation and also without noise because of those through pores.

Not being limited to the cylinder shape of the above-mentioned deodorizing material C, the embodiment of the present invention can of course come in any appropriate barrel shape, such as an ellipsoid and rectangular barrel, to fit the geometry of the intake or exhaust portion.

The above-mentioned barrel-shaped deodorizing material does not always require a single-faced corrugated fiberboard in its production. In fact, the number of through pores may come in a mountain, polygon, circle, etc. in cross-sectional geometry as far as they are provided in parallel mutually.

The experiment was accordingly conducted to prove the performance of the deodorizing material according to the present invention and came up with the following results.

A corrugated fiberboard of deodorizing material A having a corrugation height of approximately 4.5 mm was laminated into deodorizing material B with a width of 60 mm, a depth of 20 mm, a height of 60 mm, and a weight of 5.5 kg and also a 5.5-gram lump of the conventional deodorizing material was contained into an 11-mesh plastic net as a sample for comparison. On the other hand, three covered plastic buckets a, b, and c having a volume of 15 liters conventionally used as garbage cans were prepared with a 3-ml, 1.1%-concentration ammonia solution poured into each of them. Then, the plastic bucket a is allowed to stand as is, while the plastic buckets b and c are closed tightly with the cover attached inwardly with the deodorizing material B and the above-mentioned sample, i.e. lump-shaped deodorizing material, respectively. Also, those covers are provided therein with a hole which a gas detection tube is to be inserted into and therefore generally sealed except for detection. Those holes in the plastic buckets a, b, and c were opened for each elapse of prescribed time to permit the insertion of an ammonia-detection tube, coming up with the measurement results shown in Table 1. As can be seen from it, the deodorizing material B according to the present invention proved to be very effective in elimination of the bad smell.

TABLE 1

Moreover, the above-mentioned deodorizing material B was transformed into flat square-shaped deodorizing material B' having a width of 235 mm, a depth of 235 mm, a height of 80 mm, and a weight of 400 g with vertically oriented through pores of the above-mentioned corrugated fiberboard-shaped deodorizing material A. At the same time, the same size of a corrugated fiberboard box provided with pores at its upper and lower ends is prepared to contain 800-gram lump-shaped deodorizing material, which is then covered at those pores with an 11-mesh plastic net, to provide a product for comparison, i.e. lump-shaped deodorizing material. Those products were each arranged on the exhaust side of a deodorizing machine equipped with an speed-adjustable propeller fan (maximum air quantity: 6.2 m 3/min, maximum static pressure: 127 Pa), to pass an air with an ammonia-smell concentration of 20 ppm as adjusting its quantity through itself, coming up with such noise measurement results as shown in Table 2 obtained with a noise meter. As can be seen from it, with the same wind speed (air quantity), by lowering the fan speed, the noise could be reduced by 15 to 16 dB. Note here that the smell concentration of the air deodorized through the deodorizing material B' and the comparison product (lump-shaped deodorizing material) was 0 ppm.

TABLE 2

As mentioned above, the single-faced corrugated fiberboard-type deodorizing material according to the present invention bonds a corrugated fiberboard having thereon irregularities onto a flat fiberboard made of a cellulose-based substance, to form a single-faced corrugated fiberboard. Thus formed single-faced corrugated fiberboard is subsequently allowed to contain ferrous sulfate, which is subsequently oxidized into basic ferric sulfate and therefore has a large surface area. Accordingly, if this single-faced corrugated fiberboard is arranged in a refrigerator, garbage can, or boot cupboard with its base fiberboard stuck to the inner wall of any of those containers, the bad smell in the air passing through that corrugated fiberboard can be easily eliminated. Moreover, such a type of single-faced corrugated fiberboard requires rather simple machines for its production and can be fabricated and distributed easily and inexpensively.

Also, the rectangular type deodorizing material is obtained by cutting the above-mentioned single-faced corrugated fiberboard type deodorizing material to an appropriate size and laminating them as many as appropriate and then fixing them or by cutting a single-faced corrugated fiberboard to an appropriate size and laminating them as many as appropriate and then fixing them into a rectangle, which is subsequently allowed to contain ferrous sulfate which is subsequently oxidized into basic ferric sulfate. With this, this rectangular type deodorizing material has a large surface area and therefore can be put in a proper container as it is and arranged in a refrigerator, garbage can, or boot cupboard, to easily eliminate the bad smell in the air passing through this deodorizing material.

Also, the barrel-type deodorizing material is obtained by rolling the above-mentioned single-faced corrugated fiberboard-type deodorizing material into a cylinder, ellipsoid, or rectangular barrel shape or by rolling a single-faced corrugated fiberboard into any one of those shapes of a member and allowing this member to contain ferrous sulfate which is subsequently oxidized into basic ferric sulfate. Thus obtained product has an extremely larger surface area and a smaller permeation resistance and, therefore, can be arranged on the intake or exhaust side of an air blower in such a way as to fit its geometry, to permit the bad smell of the air passing through that product and also through a number of through pores to come to contact with the inner walls of those pores and then be eliminated rapidly. Moreover, those pores brings about better permeability and smoother exhaustion, resulting in almost no noise due to the permeation resistance.

TABLE 1

| Time lapse (min) | a Without sample ppm | b Deodorizing material B ppm | c Lump-shaped deodorizing material ppm |
|---|---|---|---|
| 30 | 350 | 90 | 100 |
| 60 | 560 | 100 | 120 |
| 120 | 760 | 100 | 150 |
| 210 | 980 | 50 | 100 |

TABLE 2

| Air quantity regulation gradation | Deodorizing material B | | Lump-shaped deodorizing material | |
|---|---|---|---|---|
| | Wind speed m/sec | Noize dB | Wind speed m/sec | Noize d/B |
| 10 | 0.22 | 48 | unmeasurable | 48 |
| 14 | 0.33 | 50 | " | 50 |
| 20 | 1.02 | 53 | " | 53 |
| 30 | 1.93 | 56 | 0.13 | 56 |
| 40 | 2.68 | 61 | 0.22 | 63 |
| 100 | Max. wind speed | Measurement omitted | 0.33 | 66 |

What is claimed is:

1. A deodorizing material wherein a single-faced corrugated fiberboard made of cellulose-based substance contains ferrous sulfate, which is subsequently oxidized into basic ferric sulfate.

2. A porous rectangle-shaped deodorizing material wherein the deodorant comprising a single-faced corrugated fiberboard made of cellulose-based substance that contains ferrous sulfate which is subsequently oxidized into basic ferric sulfate is cut to an appropriate size, laminated, and fixed.

3. A porous rectangle-shaped deodorizing material wherein the rectangle-shaped member comprising a single-faced corrugated fiberboard made of cellulose-based substance that is cut to appropriate size, laminated, and fixed contains ferrous sulfate which is subsequently oxidized into basic ferric sulfate.

4. A porous barrel-shaped deodorizing material wherein the deodorant comprising a single-faced corrugated fiberboard made of cellulose-based substance that contains ferrous sulfate which is subsequently oxidized into basic ferric sulfate is rolled into a cylinder, ellipsoid, rectangle, or other barrel shape.

5. A porous barrel-shaped deodorizing material wherein the member comprising a single-faced corrugated fiberboard made of cellulose-based substance that is rolled into a cylinder, ellipsoid, rectangular barrel, or other barrel shape contains ferrous sulfate which is subsequently oxidized into basic ferric sulfate.

6. A porous deodorizing material wherein the material comprises a porous, rectangle-shaped or barrel-shaped member comprising a fiberboard made of cellulose-based substance which is rolled into the barrel or rectangle shape and includes a through pore of a mountain, polygon, or cylinder shape and contains ferrous sulfate which is subsequently oxidized into basic ferric sulfate.

7. A process for producing a deodorizing single-faced corrugated fiberboard comprising the steps of:
    (a) providing a single-faced corrugated fiberboard made of cellulose-based substance that contains ferrous sulfate; and
    (b) oxidizing ferrous sulfate contained in the fiberboard into basic ferric sulfate.

8. A deodorizing single-faced corrugated fiberboard produced by the process of claim 7.

\* \* \* \* \*